United States Patent
Hwang et al.

(10) Patent No.: US 10,873,240 B2
(45) Date of Patent: Dec. 22, 2020

(54) MOTOR

(71) Applicant: Samsung Electronics Co., Ltd., Suwon-si (KR)

(72) Inventors: Kwang-Yeol Hwang, Suwon-si (KR); Jong Hyun Choi, Suwon-si (KR); In Cheol Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 216 days.

(21) Appl. No.: 15/948,094

(22) Filed: Apr. 9, 2018

(65) Prior Publication Data

US 2018/0367008 A1    Dec. 20, 2018

(30) Foreign Application Priority Data

Jun. 15, 2017    (KR) .................. 10-2017-0075858

(51) Int. Cl.
*H02K 5/22* (2006.01)
*H02K 3/52* (2006.01)
(Continued)

(52) U.S. Cl.
CPC .............. *H02K 5/225* (2013.01); *H01R 13/04* (2013.01); *H01R 13/115* (2013.01); *H02K 3/521* (2013.01);
(Continued)

(58) Field of Classification Search
CPC .... H02K 5/225; H02K 3/521; H02K 2203/06; H02K 3/50; H02K 5/22; H02K 3/34;
(Continued)

(56) References Cited

U.S. PATENT DOCUMENTS 4,656,378 A    4/1987 Atherton et al.
4,923,310 A *  5/1990 Sekiguchi ............ H01R 13/516
                                                    439/540.1
(Continued)

FOREIGN PATENT DOCUMENTS

CN    202535179 U    11/2012
EP     1191665 A1     3/2002
(Continued)

OTHER PUBLICATIONS

European Search Report dated Oct. 10, 2018 in connection with European Patent Application No. 18 16 6332, 9 pages.
(Continued)

*Primary Examiner* — Thomas Truong (57) ABSTRACT

Disclosed herein is a motor including a power connector capable of preventing current leakage to the outer case and structural interference with the outer case. The motor includes a stator provided with an insulator, a rotor configured to be rotated against the stator, a power connection portion provided in the insulator, and configured to support an end of a coil wound around the stator and configured to accommodate a mag-mate terminal, and a power connector coupled to the power connection portion to connect an external power source to the coil, wherein the power connector includes a lead wire, a fork terminal coupled to an end of the lead wire to electrically connect the lead wire to the coil and a housing configured to accommodate the end of the lead wire and the fork terminal and coupled to the power connection portion.

20 Claims, 7 Drawing Sheets

(51) Int. Cl.
*H01R 13/04* (2006.01)
*H01R 13/115* (2006.01)
*F24F 1/08* (2011.01)
*H01R 4/18* (2006.01)
*H01R 4/2437* (2018.01)
*H01R 13/627* (2006.01)

(52) U.S. Cl.
CPC ............... *F24F 1/08* (2013.01); *H01R 4/184* (2013.01); *H01R 4/2437* (2013.01); *H01R 13/6273* (2013.01); *H02K 2203/06* (2013.01)

(58) Field of Classification Search
CPC .. H01R 13/115; H01R 13/04; H01R 13/6273; H01R 4/2437; H01R 4/184; H01R 4/2429; F24F 1/08
USPC .......................................................... 310/71
See application file for complete search history.

(56) References Cited

U.S. PATENT DOCUMENTS

| | | |
|---|---|---|
| 5,204,566 A | 4/1993 | Borgen et al. |
| 2005/0054234 A1 | 3/2005 | Daniel et al. |
| 2007/0273241 A1* | 11/2007 | Niguchi ................. H02K 21/16 310/216.001 |
| 2011/0156504 A1* | 6/2011 | Kurahara ............... H02K 3/325 310/43 |
| 2011/0316365 A1* | 12/2011 | Kim ........................ H02K 1/18 310/43 |
| 2012/0049672 A1* | 3/2012 | Grosskopf ............. H01R 9/223 310/71 |
| 2012/0262015 A1* | 10/2012 | Shin ....................... H02K 3/522 310/71 |
| 2014/0015357 A1* | 1/2014 | Randolph .......... H01R 13/2442 310/71 |
| 2017/0141637 A1* | 5/2017 | Firat ..................... H02K 3/522 |

FOREIGN PATENT DOCUMENTS

| | | |
|---|---|---|
| JP | 2003158846 A | 5/2003 |
| JP | 2007159192 A | 6/2007 |
| JP | 2008223621 A | 9/2008 |
| KR | 10-2003-0041086 A | 5/2003 |

OTHER PUBLICATIONS

Communication pursuant to Article 94(3) EPC in connection with European Application No. 18166332.9 dated Aug. 5, 2020, 6 pages.

* cited by examiner

MOTOR

CROSS-REFERENCE TO RELATED APPLICATION AND CLAIM OF PRIORITY

This application is based on and claims priority under 35 U.S.C. § 119 to Korean Patent Application No. 10-2017-0075858, filed on Jun. 15, 2017, in the Korean Intellectual Property Office, the disclosure of which is incorporated by reference herein in its entirety.

TECHNICAL FIELD

Embodiments of the present disclosure relate to a motor, more particularly, to a power connector configured to electrically connect an external power source to a coil wound around a stator to apply power to a motor.

BACKGROUND

A motor is a device that converts electromagnetic energy into kinetic energy to obtain power. The motor includes a stator and a rotor, and the motor is rotated by a torque of the rotor, wherein the torque is generated by an electromagnetic field generated when a current flows through a coil wound around the stator.

In order to apply the current to the stator, a connection between the external power source and the coil wound around the stator is required. At this time, a connector corresponding to medium between the external power source and the stator coil is called a "mag-mate terminal" and a "fork terminal".

According to a conventional manner by using a mag-mate terminal, a cross section of the stator coil may be exposed to the outside. In this case, when a distance between the exposed cross section of the coil and an inner surface of an outer case is reduced, the current may be leaked through the outer case.

In addition, according to the conventional manner, a fork terminal may have a bending portion between a clamping portion and a fork portion. In this case, when the size of the outer case is reduced due to the miniaturization of the motor, structural interference may occur between the outer case and the power connector including the fork terminal. This structural interference can lead to poor performance of the motor.

SUMMARY

Therefore, it is an aspect of the present disclosure to provide a motor capable of increasing a creeping distance by preventing exposure of a cross-section of a stator coil and capable of preventing current leakage.

It is another aspect of the present disclosure to provide a motor capable of minimizing mechanism interference in a narrow space by minimizing a coupling structure between a power connector and a power connection portion.

Additional aspects of the present disclosure will be set forth in part in the description which follows and, in part, will be obvious from the description, or may be learned by practice of the present disclosure.

In accordance with one aspect of the present disclosure, a motor includes a stator provided with an insulator, a rotor configured to be rotated against the stator, a power connection portion provided in the insulator, and configured to support an end of a coil wound around the stator and configured to accommodate a mag-mate terminal, and a power connector coupled to the power connection portion to connect an external power source to the coil, wherein the power connector includes a lead wire, a fork terminal coupled to an end of the lead wire to electrically connect the lead wire to the coil and a housing configured to accommodate the end of the lead wire and the fork terminal and coupled to the power connection portion.

The fork terminal may include a clamping portion configured to compress the end of the lead wire, and a fork portion extended downward from the clamping portion and configured to be in contact with the mag-mate terminal.

The housing may be formed by an insert injection in a state in which the fork terminal and the end of the lead wire are coupled to each other.

The power connection portion may include a coupling protrusion and the housing may include a coupling hole into which the coupling protrusion is pressed-fitted.

The power connection portion may include a pair of guide portions protruding from opposite side surfaces of the power connection portion to a lateral side, and the housing may include a guide groove into which the pair of guide portions are inserted.

The mag-mate terminal may include a coil insertion portion incised to remove a covering of the coil upon being accommodated in the power connection portion, and an elastic contact portion configured to be in elastic contact with the fork portion.

A width of a yoke of the stator may be less than approximately 30 mm.

A distance between the end of the coil and an inner surface of an outer case accommodating the stator may be less than approximately 5 mm.

The housing may include a cover configured to cover the end of the coil to prevent the end of the coil from being exposed to the outside.

A distance between an outer surface of the cover and an inner surface of an outer case accommodating the stator may be equal to or greater than 0.5 mm.

A thickness of the cover may be equal to or greater than 0.5 mm.

In accordance with another aspect of the present disclosure, a motor for a compressor includes a power connection portion configured to accommodate an end of a coil wound around a stator and a mag-mate terminal, and a power connector coupled to the power connection portion to supply power to the coil, wherein the power connector includes a lead wire, a fork terminal coupled to compress an end of the lead wire and configured to be physically and electrically connected to the mag-mate terminal, and a housing configured to accommodate the end of the lead wire and the fork terminal therein and configured to cover the coil to prevent the end of the coil from being exposed to the outside.

The housing may be formed by an insert injection in a state in which the end of the lead wire and the fork terminal are compressed.

The fork terminal may include a clamping portion configured to compress the end of the lead wire, and a fork portion extended from the clamping portion to a direction in which the power connector is coupled to the power connection portion, and configured to be in contact with the mag-mate terminal.

The mag-mate terminal may include a coil insertion portion incised to remove a covering of the coil upon being accommodated in the power connection portion, and an elastic contact portion configured to be in elastic contact with the fork portion.

The power connection portion may include a coupling protrusion and the housing may include a coupling hole into which the coupling protrusion is pressed-fitted.

The power connection portion may include a pair of guide portions protruding from opposite side surfaces of the power connection portion to a lateral side, and the housing may include a guide groove into which the pair of guide portions are inserted.

A distance between the end of the coil and an inner surface of an outer case accommodating the stator may less than approximately 5 mm.

A distance between an outer surface of the housing and an inner surface of an outer case accommodating the stator may be equal to or greater than 0.5 mm.

In accordance with another aspect of the present disclosure, a motor includes a stator around which a coil is wound, and provided with an insulator, a rotor provided inside of the stator and configured to be rotated by interacting with the stator, a power connection portion provided in one side the insulator, and provided with a coil support configured to support the coil and a mag-mate terminal accommodation portion configured to accommodate a mag-mate terminal, and a power connector coupled to the power connection portion to connect an external power source to the coil, wherein the power connector includes a lead wire, and a fork terminal provided with a clamping portion coupled to an end of the lead wire and a fork portion coupled to the mag-mate terminal, wherein the clamping portion and the fork portion are arranged on the top and bottom.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Reference will now be made in detail to embodiments of the present disclosure, examples of which are illustrated in the accompanying drawings.

A motor according to an embodiment may be used in a hermetic compressor for an air conditioner.

Figure 1:
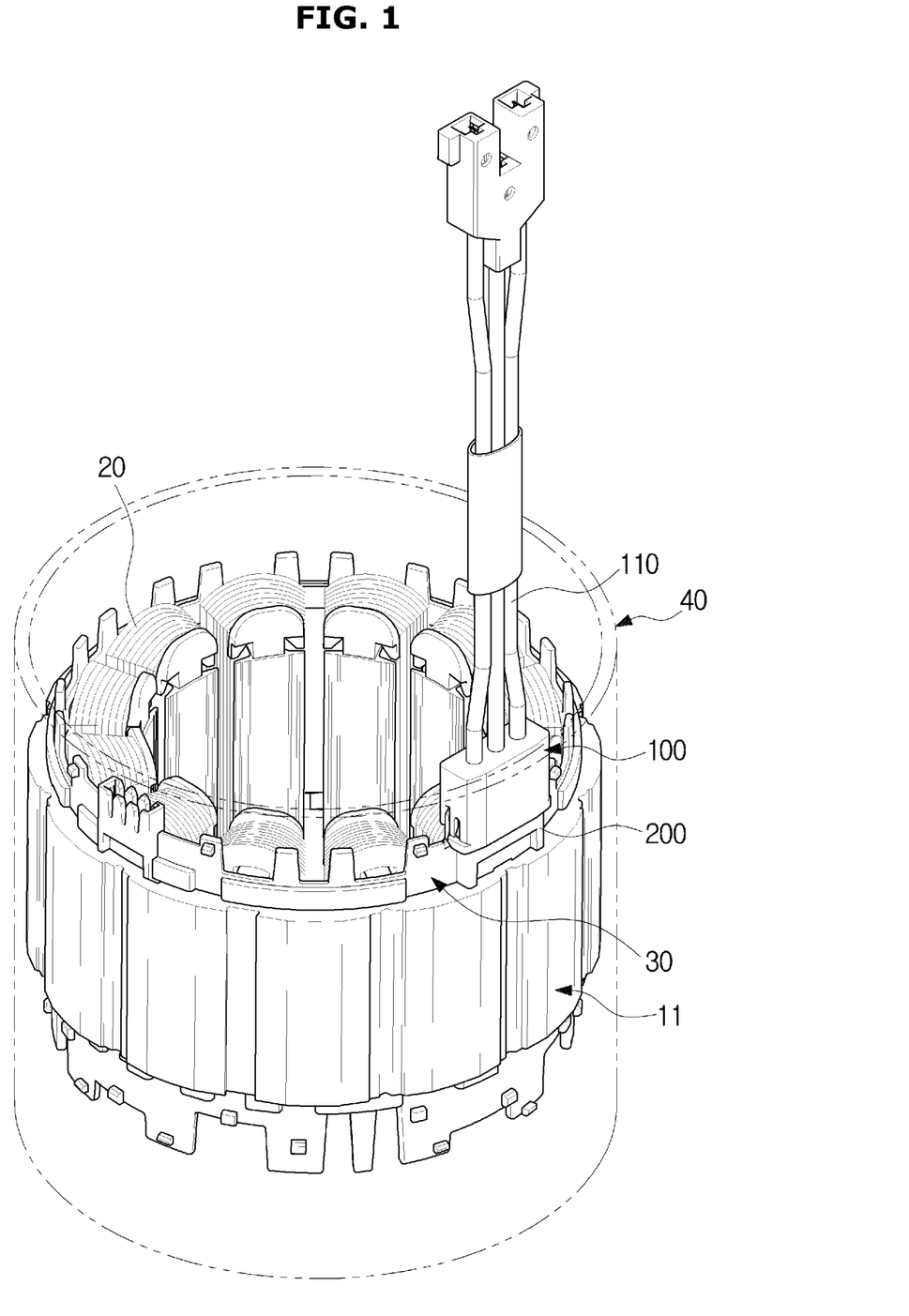
FIG. 1 is a view illustrating a state in which a power connector is coupled to a power connection portion in a motor according to an embodiment.
Figure 2:
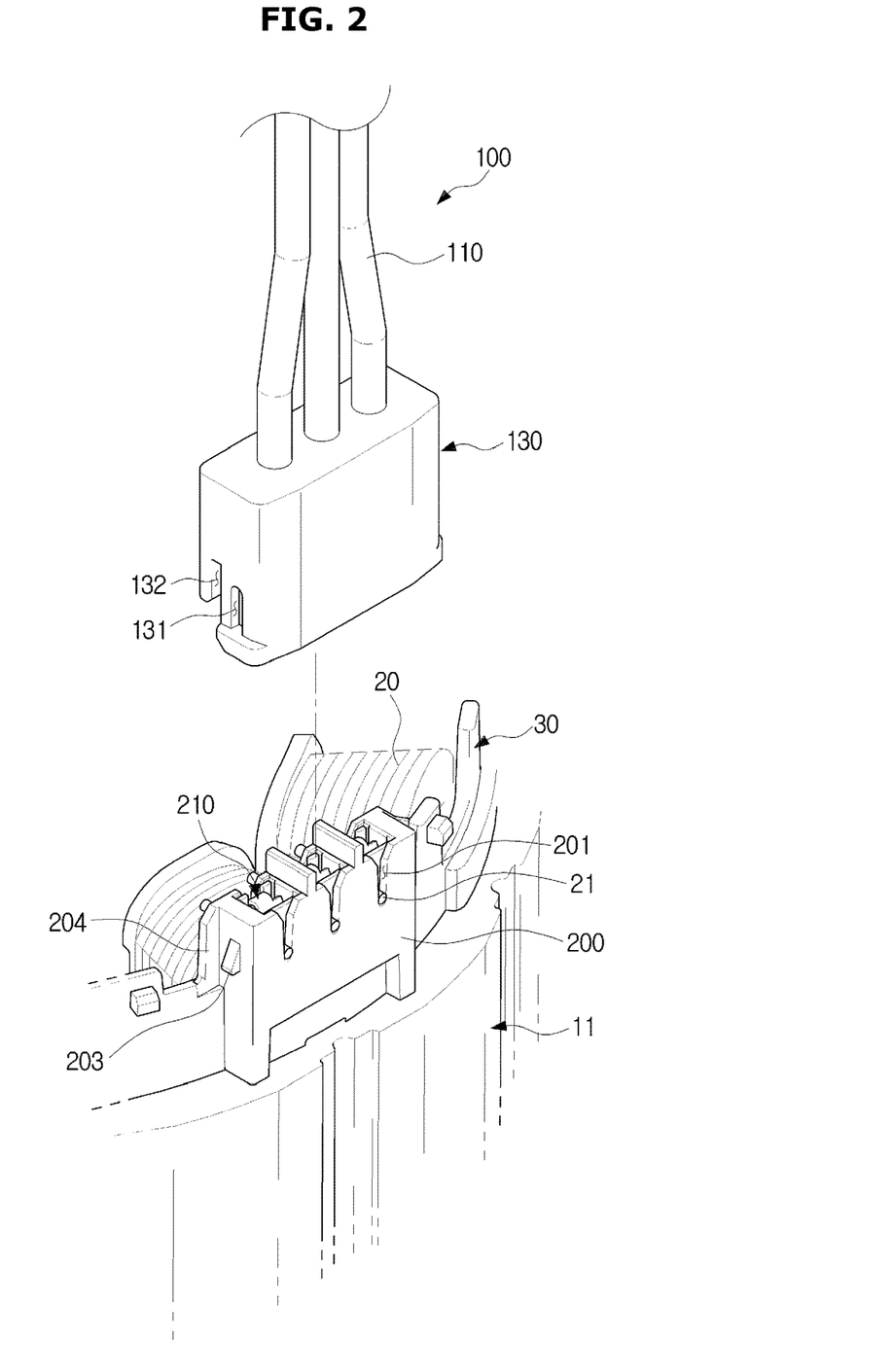
FIG. 2 is an enlarged view illustrating a state in which the power connector is separated from the power connection portion in the motor according to an embodiment.
Figure 3:
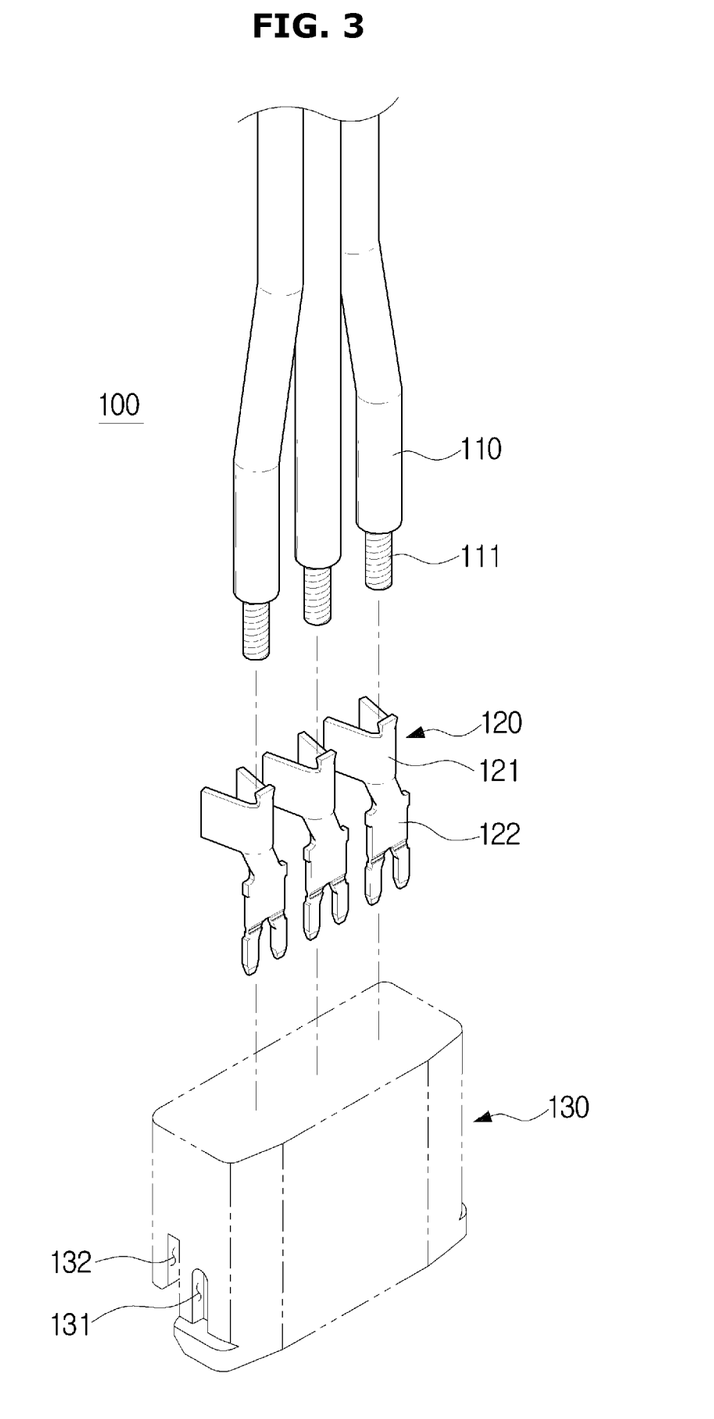
FIG. 3 is an exploded view illustrating the power connector in the motor according to an embodiment.
Figure 4:
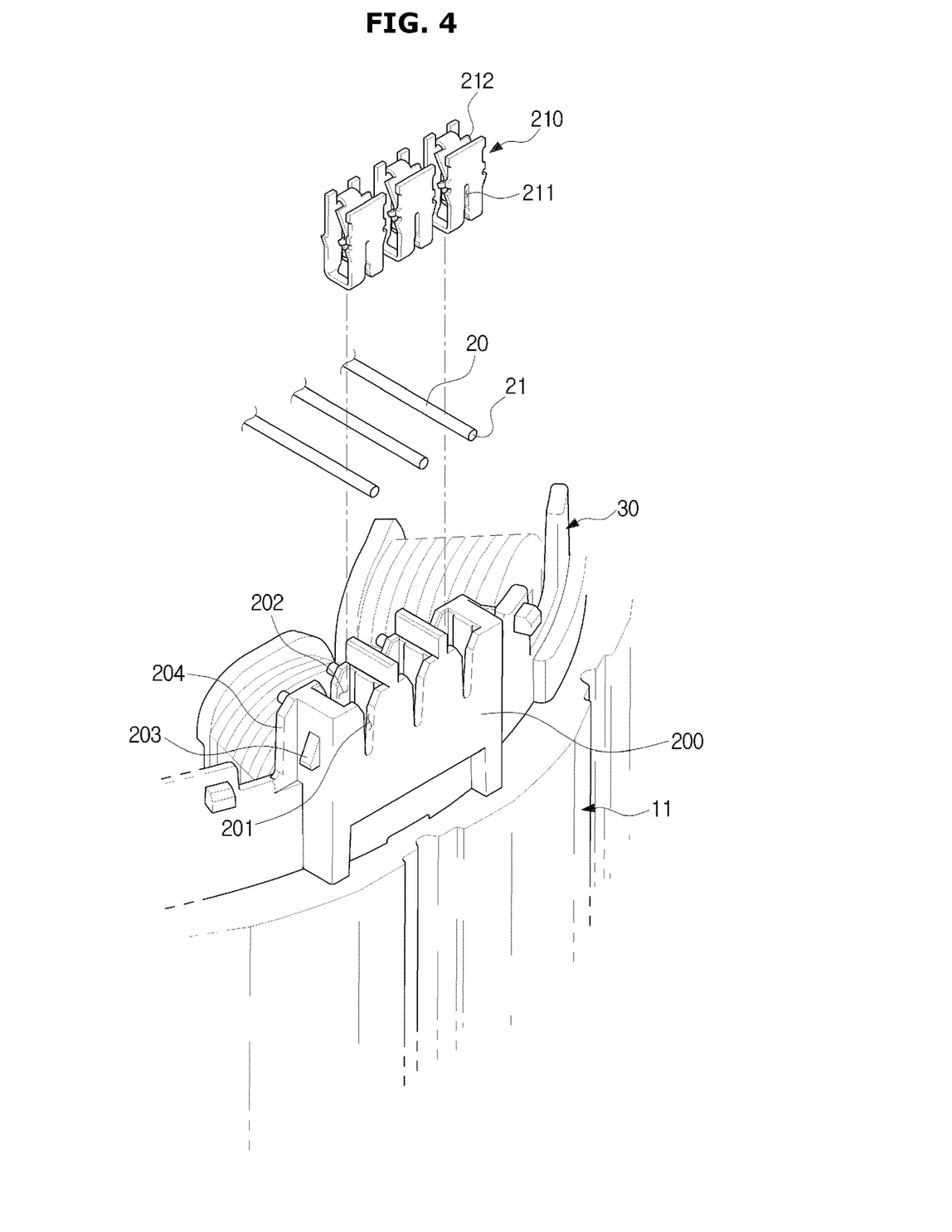
FIG. 4 is an exploded view illustrating the power connection portion in the motor according to an embodiment.

FIG. 1 is a view illustrating a state in which a power connector is coupled to a power connection portion in a motor according to an embodiment, FIG. 2 is an enlarged view illustrating a state in which the power connector is separated from the power connection portion in the motor according to an embodiment, FIG. 3 is an exploded view illustrating the power connector in the motor according to an embodiment, and FIG. 4 is an exploded view illustrating the power connection portion in the motor according to an embodiment.

As illustrated in FIG. 1, a motor may include a stator 10 around which a coil 20 is wound, a rotor (not shown) configured to be rotated by the interaction with the stator 10, a power connector 100 configured to apply power from an external power source line to the stator 10, and an outer case 40 configured to accommodate the stator 10.

The stator 10 may include a stator core 11, and an insulator 30 coupled to an upper portion and a lower portion of the stator core 11, respectively.

Figure 7:
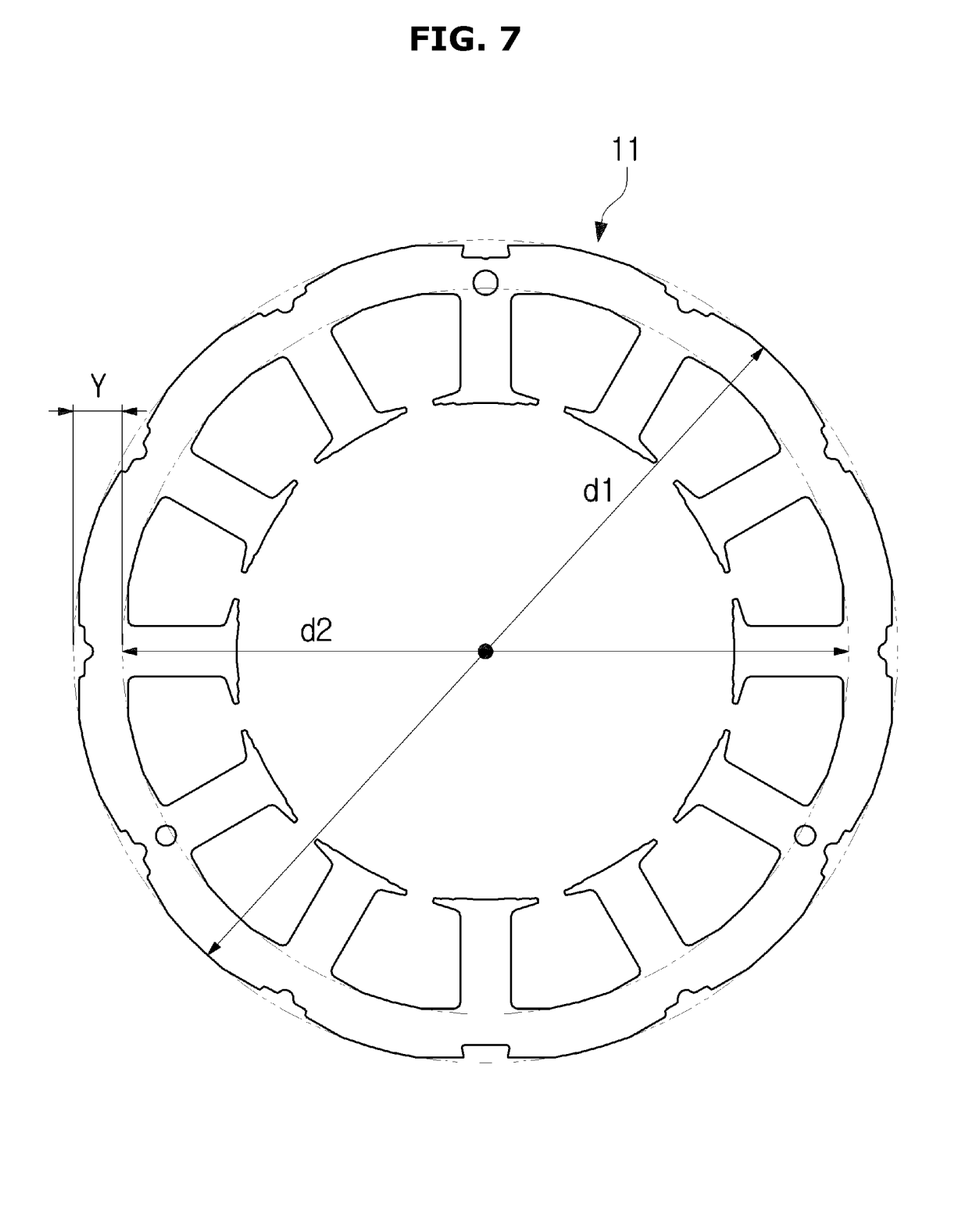
FIG. 7 is a plane view illustrating a stator core according an embodiment.

The stator core 11 may include an arc-shaped yoke 12 and a tooth 13 configured to protrude from the yoke 12 to a radially inward to allow the coil to be wound. According to an embodiment, a width of the yoke may be less than approximately 30 mm. A description thereof will be described later.

The rotor (not shown) may be provided inside the stator 10. When a current is applied to the coil 20 wound around the stator 10, the rotor (not shown) may be rotated by interacting with the stator 10. At this time, the rotor (not shown) may be rotated around a rotation axis. Meanwhile, although not shown in the drawings, the motor may include a rotation shaft mounted to the rotor and to be rotated with the rotor. Through the rotation shaft, the motor may deliver power to a compression unit (not shown) of a compressor (not shown).

The insulator 30 may be configured to insulate the coil 20 and the stator core 11. For this, the insulator 30 may be formed of an insulating material such as resin. The insulator 30 may be installed on the upper and lower portions of the stator core 11 through the press-fit method. The insulator 30 may be coupled to the upper portion of the stator core 11 from the upper side, and coupled to the lower portion of the stator core 11 from the lower side.

A power connection portion 200 may be disposed on one side of the insulator 30. The power connector 100 may be connected to the power connection portion 200 to supply power from the external power source to the coil 20.

As illustrated in FIG. 1, the power connection portion 200 may be integrally formed with the insulator 30. Alternatively, the power connection portion 200 may be separately formed and then coupled to the insulator 30.

As illustrated in FIG. 2, a mag-mate terminal 210 may be inserted into the power connection portion 200.

The mag-mate terminal 210 may include a coil insertion portion 211 formed such that a part of the mag-mate terminal 210 is incised, and an elastic contact portion 212 formed such that a part of the mag-mate terminal 210 is bent.

The coil insertion portion 211 may be configured to remove a covering of the coil 20 upon coupling between the mag-mate terminal 210 and the coil 20. The elastic contact portion 212 may be configured to be in elastic contact with the fork terminal 120 upon coupling between the power connector 100 and the power connection portion 200.

As shown in FIGS. 1 and 2, the power connector 100 and the power connection portion 200 may be coupled to each other without any separate device. By pressing-fitting the power connector 100 from the upper side of the power connection portion 200, the power connector 100 and the power connection portion 200 may be coupled to each other.

A housing 130 of the power connector 100 may include a coupling hole 131 and a guide groove 132 disposed opposite side surfaces of the housing 130.

The power connection portion 200 may include a coupling protrusion 203 and a guide portion 204 disposed opposite side surfaces of the power connection portion 200.

As illustrated in FIGS. 1 and 2, the power connector 100 and the power connection portion 200 may be coupled to each other without any separate device since the coupling protrusion 203 is inserted into the coupling hole 131. In this case, since the guide portion 204 is inserted into the guide groove 132, the power connector 100 and the power connection portion 200 may be more stably coupled to each other.

As illustrated in FIG. 3, the power connector 100 includes a lead wire 110, a fork terminal 120, and the housing 130.

The lead wire 110 may supply power to the motor from an external power source provided outside or inside the motor. The lead wire 110 and the coil 20 may be provided to correspond to u, v, and w phases, respectively.

The fork terminal 120 may include a clamping portion 121 pressed-coupled to an end 111 of the lead wire, and a fork portion 122 extended in a direction parallel to the rotation axis of the rotor (not shown).

The clamping portion 121 may be provided in the form of a metal plate facing each other. A distance between the metal plates may be larger than the end 111 of the lead wire. When the end 111 of the lead wire is positioned between the metal plates and then the clamping portion 121 is pressed, the fork terminal 120 and the lead wire 110 may be coupled to each other. However, there is no limitation on the method of applying pressure to the clamping portion 121.

The fork portion 122 may be extended downwardly from the clamping portion 121. In other words, the fork portion 122 may be extended from the clamping portion 121 to a direction in which the power connector 100 is coupled to the power connection portion 200. As mentioned above, the fork portion 122 may be extended from the clamping portion 121 to a direction parallel to the rotation axis of the rotor (not shown).

The fork portion 122 may be configured to be in contact with the elastic contact portion 212 of the mag-mate terminal 210 upon coupling between the power connector 100 and the power connection portion 200. An end of the fork portion 122 may be divided into two parts.

According to an embodiment, the fork terminal 120 may be referred to as a straight type fork terminal. Alternatively, a fork terminal in which a fork portion is extended from a clamping portion to a direction perpendicular to the rotation axis of the rotor, may be referred to as a bending-type fork terminal. As for the bending type fork terminal, a width of the power connector may be increased in comparison with an embodiment of the present disclosure. When the width of the power connector is increased, the structure interference may occur between the motor and the outer case and it lead to the quality degradation. A description thereof will be described later.

The housing 130 may accommodate the end 111 of the lead wire and the fork terminal 120 therein. The housing 130 may be configured to be coupled to the power connection portion 200. The housing 130 may cover an end 21 of the coil by being coupled to the power connection portion 200. Accordingly, when the power connector 100 is coupled to the power connection portion 200, the end 21 of the coil may be not exposed to the outside. Since the end 21 of the coil is not exposed to the outside, a creeping distance may be increased and thus the risk of the current leakage may be significantly reduced. A description thereof will be described later.

The housing 130 may be formed by insert injection. As described above, the fork terminal 120 and the lead wire 110 may be coupled to each other such that the end 111 of the lead wire is positioned at the clamping portion 121 of the fork terminal 120 and pressure is applied to the clamping portion 121. When the fork terminal 120 and the lead wire 110 are inserted into an injection device in a state in which the fork terminal 120 is coupled to the lead wire 110, the housing 130 may be formed by the insertion injection in a state in which the fork terminal 120 and the lead wire 110 are accommodated inside of the housing 130. When the housing 130 is formed by the insertion injection, the fork terminal 120 and the end 111 of the lead wire may be accommodated inside of the housing 130. Since the housing 130 is formed by the insertion injection, the power connector may be manufactured without an additional housing assembly process. Therefore, productivity may be improved and production cost may be reduced.

The coupling hole 131 and the guide groove 132 may be disposed opposite side surfaces of the housing 130. Accordingly, the power connector 100 and the power connection portion 200 may be coupled to each other without a separate device.

As illustrated in FIG. 4, the power connection portion 200 may include a coil support 201, a mag-mate accommodation portion 202, a coupling protrusion 203 and a guide portion 204.

The coil support 201 may support the coil 20. After the coil 20 corresponding to u, v, and w phases is inserted into the coil support 201, an end of the coil 20 may be cut off, as illustrated in FIG. 2.

The mag-mate terminal 210 may be inserted in the mag-mate accommodation portion 202 after the coil 20 is placed in the coil support 201, wherein the coil 20 may be inserted into the coil insertion portion 211 formed such that one side of the mag-mate terminal 210 is incised. While the coil is inserted into the coil insertion portion 211, the covering of the coil 20 may be removed. When the covering of the coil 20 is removed, the mag-mate terminal 210 and the coil 20 may be electrically connected to each other. The mag-mate terminal 210 may be electrically connected to the fork terminal 120 and the fork terminal 120 may be electrically connected to the lead wire 110. Therefore, the lead wire 110 and the coil 20 may be electrically connected to each other. Accordingly, the current may be applied from the external power source to the coil 20 through the lead wire 110.

Figure 5:
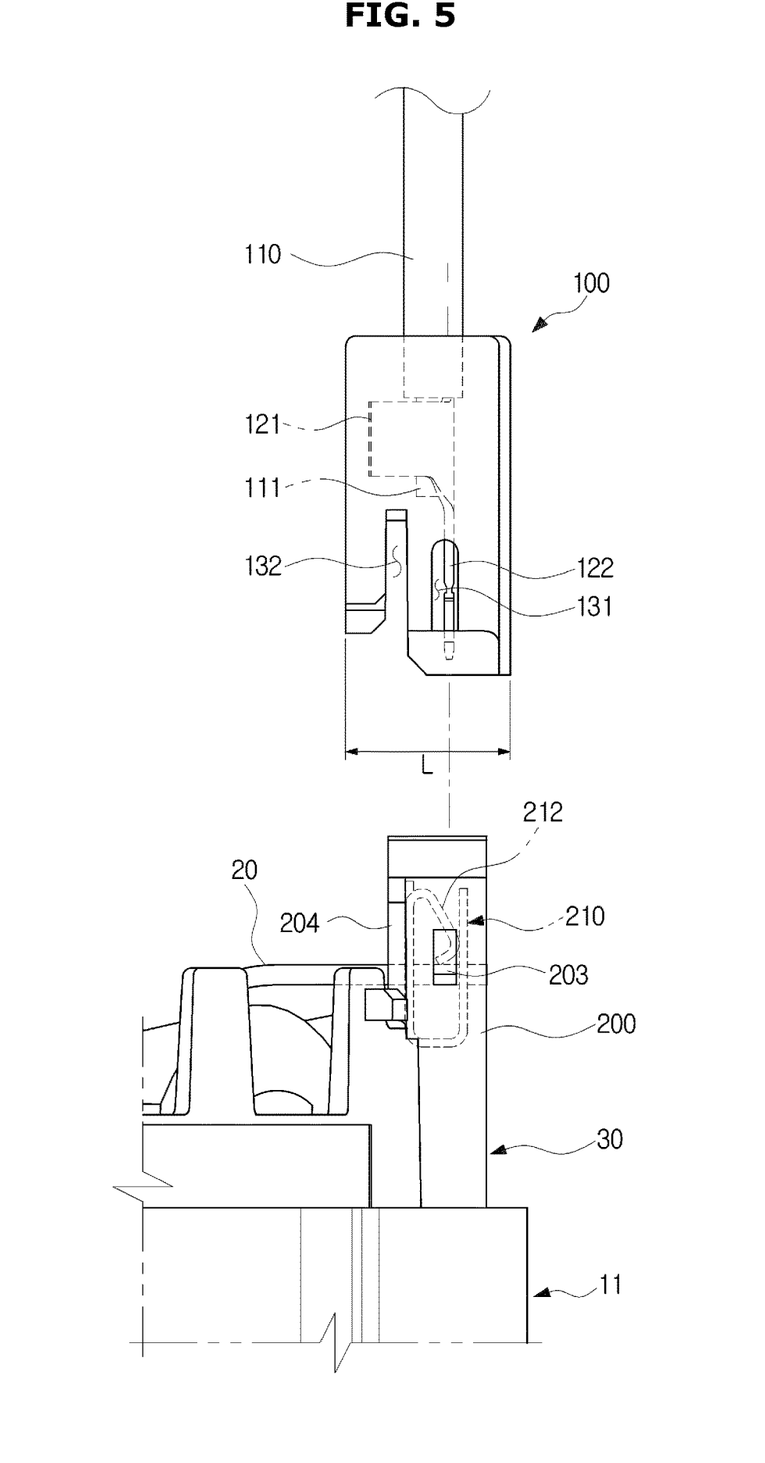
FIG. 5 is a view illustrating a state in which the power connector is separated from the power connection portion in the motor when viewing from other angle, according to an embodiment.
Figure 6:
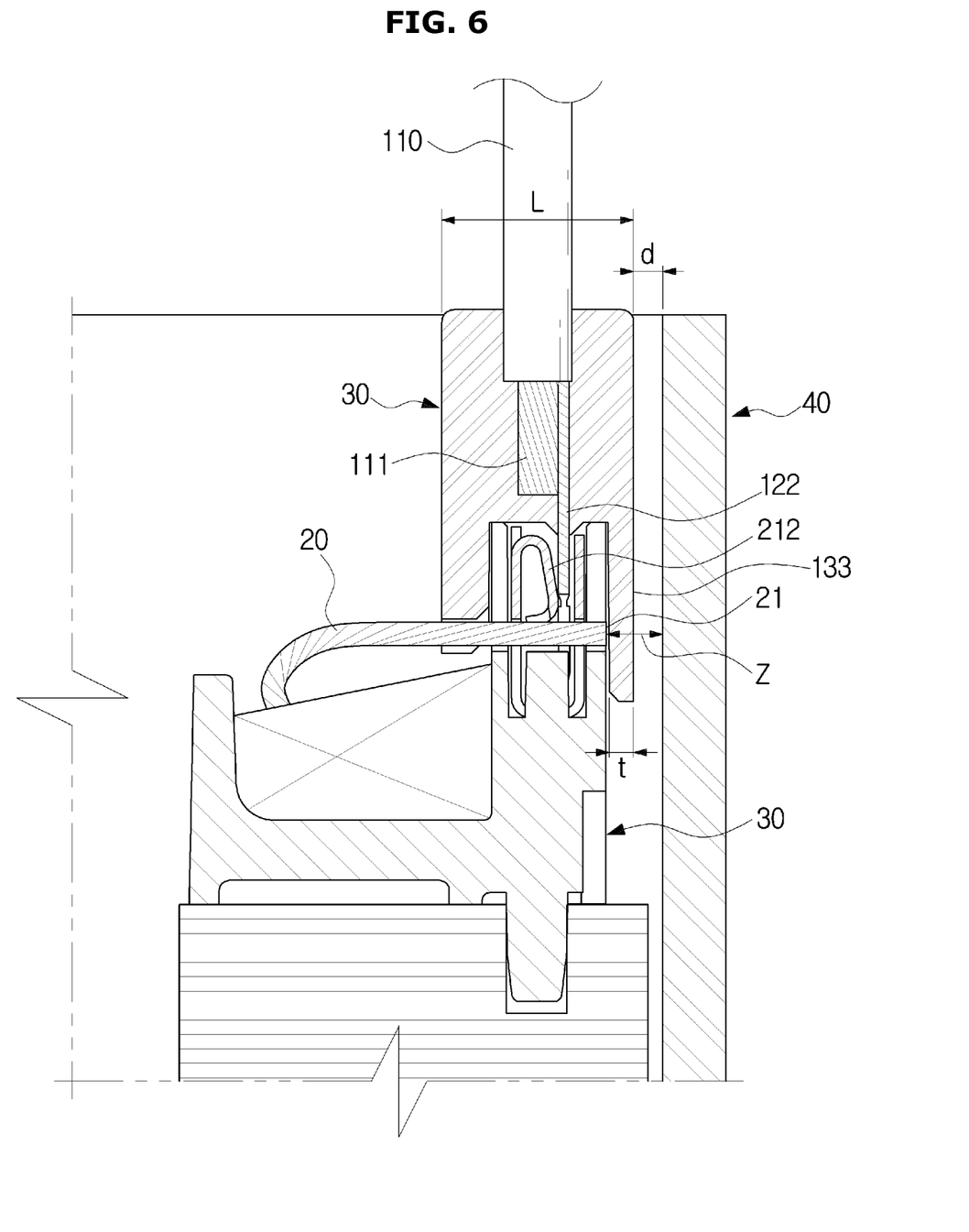
FIG. 6 is a view illustrating a state in which the power connector is coupled to the power connection portion in the motor when viewing from other angle, according to an embodiment.

FIG. 5 is a view illustrating a state in which the power connector is separated from the power connection portion in the motor when viewing from other angle, according to an embodiment, and FIG. 6 is a view illustrating a state in which the power connector is coupled to the power connection portion in the motor when viewing from other angle, according to an embodiment. FIG. 7 is a plane view illustrating a stator core according an embodiment.

A motor according to an embodiment may be used in a hermetic compressor (not shown). For example, the motor may be used in a hermetic compressor for an outdoor unit of an air conditioner. Hereinafter, the outer case 40 may correspond to a case of the hermetic compressor.

As a compressor becomes smaller, a width Y of a yoke of the stator 10 tends to gradually decrease. The width Y of the yoke of the stator 10 corresponds to a value obtained by dividing a value, which is obtained by subtracting an outer diameter d2 of a slot from an outer diameter d1 of the stator, by 2. When expressing this as an equation, it is expressed that a width Y of a yoke=(d1−d2)/2.

According to an embodiment, a motor may be used in a hermetic compressor for an air conditioner. With the miniaturization of hermetic compressor, a width Y of a yoke of the motor may be less than approximately 30 mm.

As the compressor becomes smaller, the size of the outer case of the compressor may be gradually reduced. Accordingly, a distance Z between the end 21 of the coil and the outer case 40, i.e., an insulation distance, may be gradually reduced. In the conventional manner, the current may be leaked through the outer case 40 when the insulation distance Z is reduced to be less than approximately 5 mm since the end 21 of the coil is exposed to the outside. According to an embodiment, the distance Z between the end 21 of the coil and the outer case 40 may be less than approximately 5 mm. Therefore, the current leakage may occur from the coil end 21 to the outer case 40.

As illustrated in FIG. 6, according to an embodiment, the housing 130 may include a cover 133. The cover 133 may cover the end 21 of the coil so that the end 21 of the coil is not exposed to the outside. Since the end 21 of the coil is not exposed to the outside, the risk of the current leakage may be sufficiently reduced. This is because the creeping distance between the end 21 of the coil and the outer case 40 is increased. Therefore, according to an embodiment, it may be possible to prevent the current leakage of the coil since the housing 130 is provided with the cover 133.

At this time, when the cover 133 has an extremely small thickness t, it may be possible to reduce the risk of the current leakage in comparison with a case in which the end 21 of the coil is exposed to the outside, but there may still be the risk of the current leakage. Therefore, according to an embodiment, the thickness t of the cover may be equal to or greater than 0.5 mm.

In addition, when the distance d between the outer surface of the cover 133 and the inner surfaces of the outer case 40 is extremely small, there may be the risk of the current leakage. Therefore, according to an embodiment, the distance d between the outer surface of the cover 133 and the inner surfaces of the outer case 40 may be equal to or greater than 0.5 mm.

According to embodiments, the power connector 100 may be provided with the straight type fork terminal and thus the width L of the power connector may be reduced.

As described above, when using the bending type fork terminal, a width of the power connector may be greater than the width L. In this case, since a distance between the stator 10 and the outer case 40 is reduced, the power connector may be in contact with the outer case. That is, the structure interference may occur between the power connector 100 and the outer case 40. According to an embodiment, since the power connector 100 is provided with the straight fork terminal, the width of the power connector may be relatively reduced. Accordingly, it may be possible to prevent the structure interference between the power connector 100 and the outer case 40.

As illustrated in FIG. 6, when the power connector 100 and the power connection portion 200 are coupled to each other, the fork portion 122 may be in elastic contact with the elastic contact portion 212. The fork portion 122 and the elastic contact portion 212 may be stably coupled to each other by the elastic restoring force of the elastic contact portion 212.

As is apparent from the above description, the motor is capable of increasing a creeping distance by preventing exposure of a cross-section of a stator coil and capable of preventing current leakage.

In addition, the motor is capable of minimizing mechanism interference in a narrow space by minimizing a coupling structure between a power connector and a power connection portion.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:
1. A motor comprising:
a stator provided with an insulator;
a rotor configured to be rotated against the stator;
a power connection portion provided in the insulator, and configured to support an end of a coil wound around the stator and configured to accommodate a terminal; and
a power connector coupled to the power connection portion to connect an external power source to the coil, wherein the power connector comprises:
a lead wire;
a fork terminal coupled to an end of the lead wire to electrically connect the lead wire to the coil; and
a housing configured to accommodate the end of the lead wire and the fork terminal and coupled to the power connection portion,
wherein the end of the lead wire is extended in a direction parallel to a rotation axis of the rotor, and
wherein the fork terminal is extended from the end of the lead wire to a direction parallel to the end of the lead wire.
2. The motor of claim 1, wherein the fork terminal comprises:
a clamping portion configured to compress the end of the lead wire; and
a fork portion extended downward from the clamping portion and configured to be in contact with the terminal.
3. The motor of claim 2, wherein the terminal comprises:
a coil insertion portion incised to remove a covering of the coil upon being accommodated in the power connection portion, and
an elastic contact portion configured to be in elastic contact with the fork portion.
4. The motor of claim 1, wherein the housing is formed by an insert injection in a state in which the fork terminal and the end of the lead wire are coupled to each other.
5. The motor of claim 1, wherein:
the power connection portion comprises a coupling protrusion, and
the housing comprises a coupling hole into which the coupling protrusion is pressed-fitted.
6. The motor of claim 1, wherein:
the power connection portion comprises a pair of guide portions protruding from opposite side surfaces of the power connection portion to a lateral side, and
the housing comprises a guide groove into which the pair of guide portions are inserted.
7. The motor of claim 1, wherein a width of a yoke of the stator is less than approximately 30 mm.
8. The motor of claim 1, wherein a distance between the end of the coil and an inner surface of an outer case accommodating the stator is less than approximately 5 mm.

9. The motor of claim 1, wherein the housing comprises a cover configured to cover the end of the coil to prevent the end of the coil from being exposed to the outside.

10. The motor of claim 9, wherein a distance between an outer surface of the cover and an inner surface of an outer case accommodating the stator is equal to or greater than 0.5 mm.

11. The motor of claim 9, wherein a thickness of the cover is equal to or greater than 0.5 mm.

12. A motor for a compressor comprising:
a power connection portion configured to accommodate an end of a coil wound around a stator and a terminal, and
a power connector coupled to the power connection portion to supply power to the coil,
wherein the power connector comprises:
a lead wire;
a fork terminal coupled to compress an end of the lead wire and configured to be physically and electrically connected to the terminal; and
a housing configured to accommodate the end of the lead wire and the fork terminal therein and configured to cover the coil to prevent the end of the coil from being exposed to the outside,
wherein the end of the lead wire is extended in a direction parallel to a rotation axis of a rotor, and
wherein the fork terminal is extended form the end of the lead wire to a direction parallel to the end of the lead wire.

13. The motor of claim 12, wherein the housing is formed by an insert injection in a state in which the end of the lead wire and the fork terminal are compressed.

14. The motor of claim 12, wherein the fork terminal comprises:
a clamping portion configured to compress the end of the lead wire; and
a fork portion extended from the clamping portion to a direction in which the power connector is coupled to the power connection portion, and configured to be in contact with the terminal.

15. The motor of claim 14, wherein the terminal comprises:
a coil insertion portion incised to remove a covering of the coil upon being accommodated in the power connection portion, and
an elastic contact portion configured to be in elastic contact with the fork portion.

16. The motor of claim 12, wherein:
the power connection portion comprises a coupling protrusion, and
the housing comprises a coupling hole into which the coupling protrusion is pressed-fitted.

17. The motor of claim 12, wherein:
the power connection portion comprises a pair of guide portions protruding from opposite side surfaces of the power connection portion to a lateral side, and
the housing comprises a guide groove into which the pair of guide portions are inserted.

18. The motor of claim 12, wherein a distance between the end of the coil and an inner surface of an outer case accommodating the stator is less than approximately 5 mm.

19. The motor of claim 12, wherein a distance between an outer surface of the housing and an inner surface of an outer case accommodating the stator is equal to or greater than 0.5 mm.

20. A motor comprising
a stator around which a coil is wound, and provided with an insulator;
a rotor provided inside of the stator and configured to be rotated by interacting with the stator;
a power connection portion provided in one side the insulator, and provided with a coil support configured to support the coil and a terminal accommodation portion configured to accommodate the terminal; and
a power connector coupled to the power connection portion to connect an external power source to the coil,
wherein the power connector comprises:
a lead wire; and
a fork terminal provided with a clamping portion coupled to an end of the lead wire and a fork portion coupled to the terminal, wherein the clamping portion and the fork portion are arranged on top and bottom,
wherein the end of the lead wire is extended in a direction parallel to a rotation axis of the rotor, and
wherein the fork terminal is extended from the end of the lead wire to a direction parallel to the end of the lead wire.

* * * * *